DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED NOVEMBER 24, 1970

880 O.G. 1162

T880,008

VINYL CHLORIDE RESIN PLASTISOLS HAVING IMPROVED ADHESION

David L. Valentine and Dean C. Finney, both of P.O. Box 511, Kingsport, Tenn. 37662

Continuation of application Ser. No. 651,995, July 10, 1967. This application Jan. 21, 1970, Ser. No. 4,453

Int. Cl. C08g *39/10, 51/36*

U.S. Cl. 260—873

No Drawing. 20 Pages Specification

Adhesive vinyl chloride resin plastisols are provided by incorporating certain unsaturated polyesters therein. These polyesters promote adhesion of the plastisol and may be conveniently incorporated by pre-blending with conventional vinyl resin plasticizers prior to blending such conventional plasticizers with the vinyl resin. The polyesters are unterminated, have a molecular weight of up to about 4000, and are derived from 1,4-cyclohexanedimethanol and an unsaturated carboxylic acid having 4 or 5 carbon atoms.